United States Patent
Paradinas et al.

(10) Patent No.: US 6,862,614 B2
(45) Date of Patent: Mar. 1, 2005

(54) ADAPTATION OF SERVICE APPLICATIONS TO HETEROGENEOUS EXECUTION CONTEXT BY MEANS OF SMART CARDS

(75) Inventors: Pierre Paradinas, Meyreuil (FR); Jean-Jacques Vandewalle, Marseilles (FR); Christophe Muller, Aix-en-Provence (FR); Philippe Merle, Saint André Lez Lille (FR); Christophe Gransart, Lille (FR); Jean-Marc Geib, Hellemes (FR)

(73) Assignee: Gemplus, Gemnos (FR)

( * ) Notice: Subject to any disclaimer, the term of this patent is extended or adjusted under 35 U.S.C. 154(b) by 761 days.

(21) Appl. No.: 09/785,321

(22) Filed: Feb. 20, 2001

(65) Prior Publication Data

US 2002/0116478 A1 Aug. 22, 2002

(51) Int. Cl.$^7$ ............................................. G06F 15/177
(52) U.S. Cl. ....................................... 709/220; 709/222
(58) Field of Search ................................ 709/220, 221, 709/222, 250

(56) References Cited

U.S. PATENT DOCUMENTS

| | | | | |
|---|---|---|---|---|
| 4,874,935 A | * | 10/1989 | Younger ...................... | 235/492 |
| 5,844,218 A | * | 12/1998 | Kawan et al. ............... | 235/380 |
| 6,101,477 A | * | 8/2000 | Hohle et al. .................. | 705/1 |
| 6,209,127 B1 | * | 3/2001 | Mori et al. ................... | 717/162 |
| 6,317,755 B1 | * | 11/2001 | Rakers et al. ................ | 707/204 |
| 6,360,952 B1 | * | 3/2002 | Kimlinger et al. .......... | 235/492 |
| 6,366,898 B2 | * | 4/2002 | Taivalsaari et al. ........... | 707/1 |
| 6,557,032 B1 | * | 4/2003 | Jones et al. .................. | 709/220 |
| 6,564,995 B1 | * | 5/2003 | Montgomery ................ | 235/379 |
| 6,728,750 B1 | * | 4/2004 | Anderson et al. ........... | 709/201 |
| 2002/0066792 A1 | * | 6/2002 | Guthery et al. .............. | 235/492 |
| 2002/0175207 A1 | * | 11/2002 | Kashef et al. ............... | 235/380 |
| 2004/0040026 A1 | * | 2/2004 | Farrugia ...................... | 719/310 |

FOREIGN PATENT DOCUMENTS

| | | | | |
|---|---|---|---|---|
| EP | 0 949 595 A2 | * | 10/1999 | ............. G07F/7/10 |

OTHER PUBLICATIONS

Value–added Services: How to benefit from Smart Cards. Marvie et al., Copyright 2000.*
Smart Cards: A System Support for Service Accessibility from Heterogeneous Devices. http://www.lifl.fr/~marvie/research/docs/sigops_ew2000.pdf, SIGOPS European Workshop 2000 Kolding, Denmark–Sept. 17–20, 2000.*
Java Developer, Oct. 1998, How to write OpenCard card services for Java Card applets, Thomas Schaeck et al.*
CESURE: une plate–forme d'applications adaptables et securisees pour usagers mobiles, Pellegrini et al., May 2000.*
CESURE Configuration et Execution de Services pour les Usagers mobiles des Reseaux Etendus, Nov. 24, 1999.*

* cited by examiner

*Primary Examiner*—Fritz Fleming
(74) *Attorney, Agent, or Firm*—Burns, Doane, Swecker & Mathis, L.L.P.

(57) ABSTRACT

Service applications are provided on multiple types of devices with different execution contexts. A smart card stores the application description, and processes it to install an adapted configuration of the application for whatever device it is inserted in. Smart cards are compatible with many devices, as well as being small, resistant, and tamper-proof. In addition to security features, their processing capacities can be used to at least partially treat the abstract descriptions of the applications in order to produce concrete descriptions adapted to the execution context.

18 Claims, 2 Drawing Sheets

ADAPTATION OF SERVICE APPLICATIONS TO HETEROGENEOUS EXECUTION CONTEXT BY MEANS OF SMART CARDS

FIELD OF THE INVENTION

The present invention relates to service applications intended to be used on multiple types of devices by mobile users on a geographically diverse network, and more particularly to the use of smart cards to provide access to such applications from multiple access points, as well as personalization for each of their users.

BACKGROUND OF THE INVENTION

Applications that provide access to services such as banking, local weather information, stock transactions and the like are becoming ever more prevalent in society. Furthermore, today's users of application services are becoming more and more nomadic. They desire to access available services wherever they are, and regardless of the device they use for such access. The number of types of devices used to connect to information systems increases from day to day, ranging from larger fixed devices, such as a settop box, to small portable devices, such as PDAs (Personal Digital Assistants) or mobile phones. This proliferation of different devices has deep impact on the practical implementation of service applications.

More particularly, providing such an application on a wide range of terminals, and more generally in heterogeneous execution contexts, usually requires developing a dedicated version for each of these contexts. This increases the costs of these applications. Consequently, application service providers have to choose between two alternatives:

1—to provide the same application for multiple contexts, with heavy development and maintenance costs; or 2—to provide their applications for a single context, with lower costs, but a smaller user population.

Developing a monolithic, dedicated, instance of these applications for each of these devices leads to complexity at each of the following stages of application development and deployment:

during the development phase, because of the duplications in the different versions, and the well-known complexity of developing large software;

during software updates, as any minor modification in the service behavior implies rebuilding all application instances;

during software distribution, because each user might need all application instances, as they may use any of several devices. This implies providing them a huge amount of software;

and finally during execution, as users have to completely reinstall their applications each time they use them.

In an effort to overcome these problems, applications have been developed as a collection of interconnected modules. A module is a piece of software code providing a well-defined function. It can for instance be an object, or a component. The assembly of software that constitutes the application can be formally described in a descriptor, that offers an abstract view of the application. It is rendered in a concrete form when it is translated into an executable instance of the application, i.e. module instances ready to run on various execution platforms (e.g. PCs, servers, or devices).

This modular structure facilitates the development and maintenance by isolating development concerns. A team can work on a specific aspect of the application, and the modification of one module's behavior doesn't impact other modules. Furthermore, the execution of the various modules can be distributed on different execution platforms, as long as they can communicate. This minimizes the implementation dedicated to the user device, by narrowing it to the behavior that has to be located on the user device (e.g. the user interface). It is then possible to keep a single implementation of the rest of the code, provided that it is always executed on the same kind of execution platform. However, multiple implementations can still be provided, in order to extend the range of possible execution platforms.

The deployment (i.e. the installation and preparation for execution) of such applications can be based on their abstract description, captured in their descriptor, that lists the modules' characteristics, their execution constraints (such as where they must be located), and their interconnections.

This approach for the development of applications is being applied in an increasing number of projects. Several technologies, including, but not limited to, COM+ from Microsoft Corporation, Enterprise Java Beans (EJB) from Sun Microsystems Inc., or CORBA Component Model from the Object Management Group (OMG) promote this approach. But there is not yet any solution to provide these applications to a large public using very heterogeneous devices.

The problem mostly resides in finding a means to present to the user device the application descriptor, and how this information can be automatically processed to produce an adapted application instance, transparently for the user. The solution must be applicable to most existing, emerging and future devices, and it must be safe to preserve confidentiality of the descriptor and to prevent illegal uses of the service.

Three solutions can be considered to store and deliver the descriptor to the device:

1—A first solution is to store the descriptor on a distant server. To access it, the user has to give the server address and a secret code, e.g. a PIN, to the device being used. After the connection, the device downloads the descriptor and personalization parameters. This solution doesn't suit a large user population, for it requires users to remember and enter on the device complex information, such as the server address. Furthermore, it will be generally entered differently on different devices. In addition, this solution requires the server to always be accessible, which inhibit use of the service in places where the server cannot be accessed (such as an enterprise intranet).

2—A second solution is to store on each device the descriptor of all applications. This is not feasible, as the set of possible applications is huge, unknown, and evolves daily.

3—A third solution consists in using a personal and portable storage medium, that each user would have with him, containing his application descriptors. It could for instance be a CD-ROM, a magnetic disk, or a memory stick. However these media are not directly usable in a number of devices, either because they have a very limited set of pluggable media (e.g. mobile phones), or because it would require an external dedicated reader (e.g. a CD-ROM reader for a PDA). In addition, storage media offer poor confidentiality of their content, as they do not have the processing capacity necessary to selectively present the data they hold. Cyphering their content would require a server to decypher it, with the defects presented in (1), and would still allow copies to be made. Furthermore, they cannot perform any processing on the descriptors, implying that all the adaptation has to be performed by the device. This would require each device to hold a dedicated implementation of the adaptation software.

SUMMARY OF THE INVENTION

The invention proposes a means to facilitate the provision of service applications on multiple devices and execution contexts. It is based on the use of a smart card that stores the application description, and processes it to install an adapted configuration of the application for whatever device it is inserted in. Smart cards are compatible with many devices, as well as being small, resistant, and tamper-proof. In addition to security features, their processing capacities can be used to at least partially treat the abstract descriptions of the applications in order to produce concrete descriptions adapted to the execution context.

The invention utilizes the following features that are inherent to a smart card:

holding data—this is one of the primary feature of smart cards. The invention allows the implementation to use any available technique to store data. It can for instance be done in an ISO/IEC 7816-4 compliant smart card in one or multiple Dedicated Files (DF), and/or one or multiple Elementary Files (EF). It can also be done on open platform cards, such as JavaCard™ cards, using card applets (such as the Personal Naming and Directory Service, PNDS), or Windows-based smart cards. Cards which are able to hold multiple data can hold descriptions of multiple applications.

processing data—this can be done by any kind of code, whether it is stored in a ROM, or in volatile memory, such as a JavaCard applet.

communication capacities—the card has to communicate with the external execution environment, which includes the device into which it is plugged. This environment may also include, but is not limited to, distant servers, others devices, and in particular other smart cards.

portability—a smart card is portable. The same smart card can serve for multiple applications, and can be inserted in different devices of possibly different kinds.

The invention focuses on the adaptation of applications to very heterogeneous execution contexts using a smart card. To this end, an application is implemented with a modular structure, and an abstract description of this structure is stored in a smart card. The smart card also holds a software entity, called a bootstrap, which processes this description and communicates with the external execution environment to ensure the application is made available on the device to which it is connected. This allows a single application description to be distributed to users, in a variety of forms depending on the device and execution context at a given user session.

Furthermore, as smart cards only hold the description of the application, any modification that regards implementation, and does not change the application structure, will be transparently and immediately accessible for the user, as it does not require any modification of the card content.

These and other features and advantages of the invention are described hereinafter in greater detail with reference to specific embodiments illustrated on the accompanying drawings.

DETAILED DESCRIPTION

In the implementation of the present invention, applications are developed as assemblies of interconnected software components. The following characteristics of the individual modules that form the software components permit them to be independent of one another:

they are not necessarily stored nor executed on the same platform;

they are not necessarily developed using the same programming language nor development framework; and they are not necessarily targeted to the same execution platform.

Figure 1:
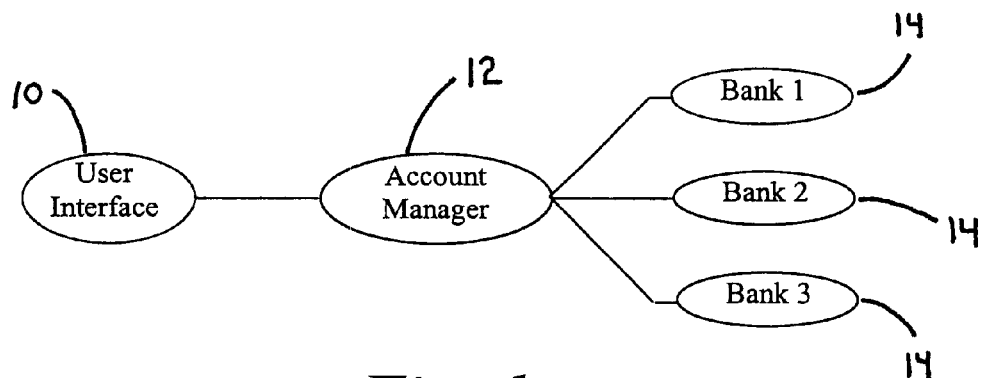
FIG. 1 is a block diagram of an exemplary service application having a modular structure.

To facilitate an understanding of the invention, it is described with reference to an exemplary service application, that allows a user to manage multiple bank accounts. It provides the balance of all of a user's accounts, whatever bank they may be maintained in, and performs transfers between these accounts. FIG. 1 graphically illustrates the application structure. Each oval is a software module, and lines between two ovals indicate that a communication link has to be established between the two corresponding modules to construct the application.

The "User Interface" module 10 provides display functions to present data on the user device, and input functions to allow the user to request transfers. This module uses the "Account Manager" module 12, which provides the various account management operations (balance, transfers, etc.). This module itself uses the "Bank" modules 14 associated with the banks or other financial institutions that hold the user accounts.

Once the modular application has been developed, a description of the application is then produced. The formalism used to produce this description could be any of a number of well-known varieties. It could be a textual description, for instance using XML, or in a specialized language, such as an existing or forthcoming Application Description Language (ADL). It could also be stored in binary data form (e.g. tables, or trees) that can directly be handled in a programming language. It could also be stored as an executable code, such as a script, Java, or a binary code. This description is an abstract view of the application, as it describes its structure (i.e. its components and their connections), but doesn't provide the execution-dependent part of the implementation.

Figure 2:
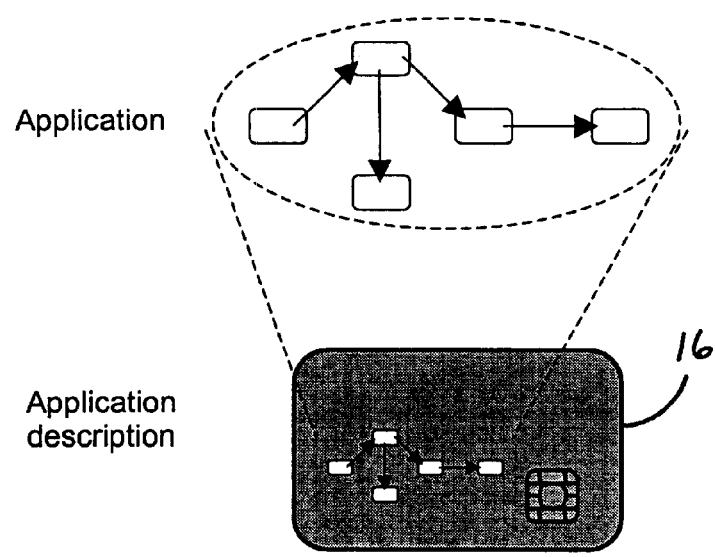
FIG. 2 is pictorial illustration of the storage of an application descriptor on a smart card.

Referring to FIG. 2, this description is then stored in a smart card 16. The particular manner in which it is stored in the card is an implementation choice, possibly related to the formalism mentioned above. An Elementary File (EF), a JavaCard applet, a Windows for Smart Card file, or Personal Naming and Directory Service (PNDS) data are examples of possible storage mechanisms.

Figure 3:
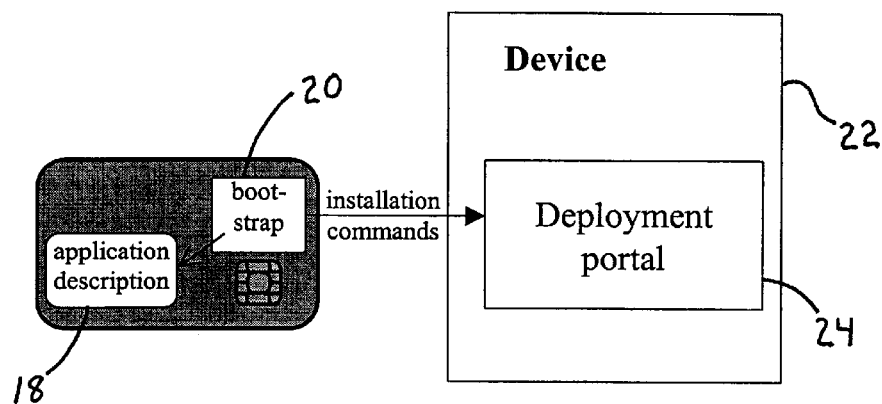
FIG. 3 is a pictorial representation of the relationship of the smart card to the device used to access a service.

In addition to the application descriptor 18, as depicted in FIG. 3 the smart card contains a software component 20 that is labeled a "bootstrap" in the context of the present invention. When the user connects the smart card to a device 22 and asks for the execution of the application, the bootstrap is activated. It causes the installation of the application to be carried out in the execution environment in which the smart card is connected. It does so by analyzing the application description stored in the card. The separation between the bootstrap and the application description allows a single bootstrap to be used in a card for multiple application descriptions. However, in certain configurations, the bootstrap may be incorporated within the description.

The installation of the service application operates to select module implementations and instantiate them according to the execution context. The context information can include the type of device, its offered service, as well as server and network loads. The installation also consists in establishing communications between these modules as defined in the application description.

The device 22 must execute software to communicate with the smart card. In the context of this invention, this software is known as the deployment portal 24. Its role is to make available the application based on the information provided by the bootstrap. The deployment portal implementation is specific for each kind of device, but all implementations provide the same deployment service to the card bootstrap. This is ensured by defining a well-known interface between the bootstrap and the deployment portal, which provides the ability to:

activate services on the card 16 or other resources to which the device is connected, authenticate parties, pass deployment commands, pass deployment command results, and acquire execution context information.

One standard communication protocol for smart cards is defined in ISO/IEC 7816-4. This protocol limits the possible communication schemes between the card and the device. Specifically, the device 22 is always the initiator of a dialog, and the card is only able to respond to a request from the device. However, even with this communication protocol, it is possible to give to the card the control of the dialog. To do so, the device continuously sends requests to the card asking for installation commands. In response to the request, the card emits its command. The device may then treat it, or immediately ask for a new command. Other communication protocols may be used, which may or not require the same control inversion.

In case the communication protocol between the card and the device permits the card to take the initiative of the dialog, the bootstrap does not need to be first activated by the deployment portal. It can spontaneously initiate the deployment. An example of a protocol allowing such a behavior is TCP/IP.

The deployment portal can delegate part or the full processing of installation commands to any service it has access to. For instance, it may employ a distributed framework to locate, instantiate and execute the application modules. It can use radio or hard wired communications to communicate with these services.

The smart card and the deployment portal establish a dialog that allows the abstract application description to be realized by enriching it with information regarding the device used, and more generally the execution context. This dialog may take different forms, among which:

the smart card can query the deployment portal to discover the execution context; and/or the installation commands emitted by the smart card can contain place holders informing the deployment portal what information it should add to the command before processing it.

Following this installation, the user has access to a service through an interface on the device, which is adapted to that device (graphical windows on a PC, text on a mobile phone, etc.) and to the user (language, security level, etc.). It is to be noted that this does not prevent the option of using the smart card for other functions, such as traditional user authentication or loyalty applications. It can also be used to host application modules, that could for instance be loaded during deployment phase, or during card personalization.

Referring again to the specific example illustrated in FIG. 1, the banking application description stored in the smart card can contain both user related and non-user related information, including, but not limited to:

the application modules list, and their interconnections;

the service options to which the user has subscribed (permitted operations for instance);

the user accounts list.

Figure 4:
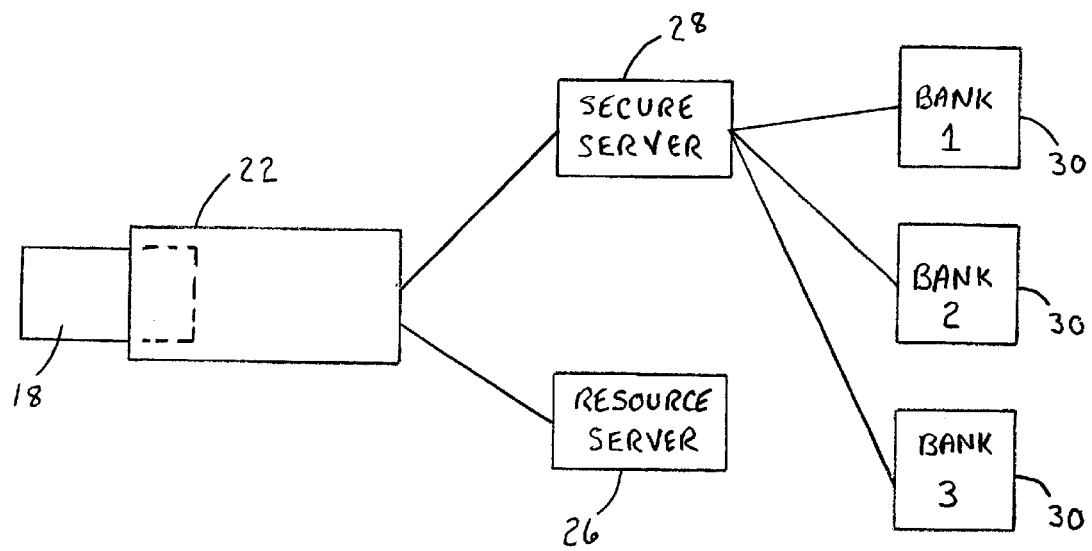
FIG. 4 is a block diagram of a distributed computing system which provides the application services by means of a smart card.

Referring to FIG. 4, once the smart card has been loaded with the application descriptor and the bootstrap, the user inserts the card 16 in a device 22, for instance a mobile phone, a card reader connected to a PC, or an Internet kiosk in a public place. The card informs the device of the applications it can provide access to, and the device displays a list of these applications. The user selects the banking application, and enters his secret code. The bootstrap on the card then starts analyzing the application description, and drives the application deployment by sending installation commands to the device 22, to cause it to instantiate the components of the application and configure them to be connected in the appropriate manner. In response to these commands, the deployment portal on the device sets up a "User Interface" implementation that is designed for execution on the device. The "User Interface" module could be stored locally on the device, or retrieved from a remote server 26 with which the device communicates. For instance, if the device is a mobile phone, the remote server could be located on a wireless communication network and provide a text-based user interface implementation that is appropriate for the display screen of a mobile phone. If the device is an Internet kiosk, the server 26 could be a resource on the Internet which provides a graphics-based implementation that is more suited to the display of the kiosk.

The deployment portal also instructs the device to locate the "Account Manager" on a distant, secure, server 28, particularly if the device is a public terminal that cannot be trusted to host a module handling such confidential information. Another alternative would be to host this module, or other type of client module, on the smart card itself. The "User Interface" and "Account Manager" modules are then configured according the user profile. The installation then locates the bank servers 30, which are likely to be already running, and establishes connections between them and the newly instantiated "Account Manager" module. In this manner, a concrete implementation of the service application is created, and the user can access the service via the device 22.

It is to be noted that the invention can be implemented on media analogous to a smart card, in particular on so called "smart objects", i.e. mobile objects with storage and execution capabilities, such as PDAs.

It will be appreciated by those of ordinary skill in the art that the present invention can be embodied in other specific forms without departing from the spirit or central characteristics thereof. The presently disclosed embodiments are therefore considered in all respects to be illustrative, and not restrictive. The scope of the invention is indicated by the appended claims, rather than the foregoing description, and all changes that come within the meaning and range of equivalents thereof are intended to be embraced therein.

What is claimed is:

1. A system for providing application service to users by means of any of a plurality of devices, comprising:
   a smart object that provides storage and execution capabilities, and having stored therein at least one descriptor for a service application which describes components of the application and connections of those components, and a bootstrap program that is capable of analyzing said descriptor and issuing commands to instantiate the components; and
   at least one device with which said smart object communicates, said device containing a deployment program that receives said commands and, in response thereto, causes instantiations of components which are appropriate to the execution context provided by said device to be installed, to thereby create an instance of said service application which can be accessed from said device.

2. The system of claim 1 wherein said commands comprise abstract descriptions of said application components that are enhanced with information regarding the execution context provided by said device.

3. The system of claim 2 wherein said information is obtained by the bootstrap program from the device.

4. The system of claim 1 wherein said commands comprise abstract descriptions of said application components and instructions for the device to append information relating to the execution context which said device provides.

5. The system of claim 1 wherein at least one of said components is stored in said smart object.

6. The system of claim 1 wherein at least one of said components is stored in said device.

7. The system of claim 1 wherein at least one of said components is stored on a remote server with which said device communicates.

8. The system of claim 1 wherein said smart object is a smart card.

9. The system of claim 1 wherein said smart object is a personal digital assistant.

10. A method for providing application services to users by means of any of a plurality of devices, comprising the steps of:
    storing at least one descriptor for a service application on a portable electronic device, which describes components of the application and connections of those components, and a bootstrap program that is capable of analyzing said descriptor and issuing commands to instantiate the components; and
    transmitting said commands to a deployment program stored on a network node with which said portable electronic device communicates, said deployment program being responsive to said commands to cause instantiations of components which are appropriate to the execution context provided by said node to be installed, and thereby create an instance of said service application which can be accessed from said node.

11. The method of claim 10 wherein said commands comprise abstract descriptions of said application components that are enhanced with information regarding the execution context provided by said node.

12. The method of claim 11 wherein said information is obtained by the bootstrap program from the node.

13. The method of claim 10 wherein said commands comprise abstract descriptions of said application components and instructions for the node to append information relating to the execution context which said mode provides.

14. The method of claim 10 wherein at least one of said components is stored in said portable electronic device.

15. The method of claim 10 wherein at least one of said components is stored in said node.

16. The method of claim 10 wherein at least one of said components is stored on a remote server with which said node communicates.

17. The method of claim 10 wherein said portable electronic device is a smart object.

18. The method of claim 17 wherein said smart object is a smart card.

* * * * *